(No Model.)
J. ECCLES.
CORN HOLDER.
No. 557,782.   Patented Apr. 7, 1896.
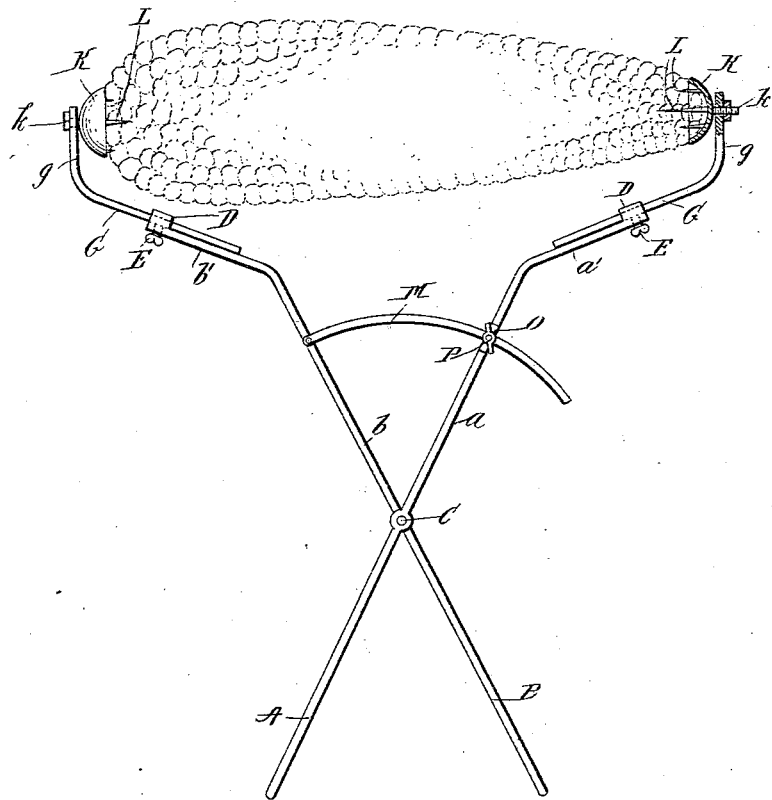
WITNESSES:
John Buckler,
C. Gerst
INVENTOR
James Eccles
BY
Edgar Tate & Co.
ATTORNEYS.

United States Patent Office.

JAMES ECCLES, OF NEWARK, NEW JERSEY.

CORN-HOLDER.

SPECIFICATION forming part of Letters Patent No. 557,782, dated April 7, 1896.

Application filed November 12, 1895. Serial No. 568,713. (No model.)

*To all whom it may concern:*

Be it known that I, JAMES ECCLES, a citizen of the United States, and a resident of Newark, in the county of Essex and State of New Jersey, have invented certain new and useful Improvements in Corn-Holders, of which the following is a specification, reference being had to the accompanying drawing, forming a part thereof, in which similar letters of reference indicate corresponding parts.

This invention relates to table implements, and particularly to that class known as "corn-holders;" and the object of the invention is to produce an effective device of this class which is simple in construction and operation and by means of which an ear of hot corn may be held and manipulated without applying the hands thereto.

The invention is fully disclosed in the following specification, of which the accompanying drawing forms a part, said drawing being a side elevation of my improved corn-holder, showing also the method of its operation.

In the practice of my invention I provide a corn-holder consisting of two separate arms or handles A and B, which are pivotally connected at C, and each of which is extended, as shown at $a$ and $b$, respectively, the extensions being in line with the main parts or handles A and B for the greater portion of their lengths, and near the end each is bent or inclined, as shown at $b'$ and $a'$, respectively, so as to form inclined shanks, with each of which is connected a ring or band D into which projects a set-screw E.

Mounted in each of the rings or bands D is a sliding arm G, the ends of which are each bent upwardly or outwardly, so as to form parallel projections $g$, and pivotally connected with the ends of these projections is a cup-shaped holder K, said holders being connected with the projections G by means of bolts $k$, provided with the usual nuts or heads, and each of said holders is also provided with inwardly-directed prongs or projections L, which are adapted to be inserted into the ends of an ear of corn, as shown in the drawing.

Pivotally connected with the extension $b$ of the arm or handle B is a segmental arm M, which passes through the attachment O, which is mounted on the extension $a$ of the arm or handle A, and a set-screw P is employed to secure these parts together at any desired position; and the operation will be readily understood from the foregoing description, when taken in connection with the accompanying drawing.

The cup-shaped holders are revoluble on their supports, and in operation an ear of corn is placed between these holders and the device is grasped by the handles A and B. After the ear of corn has been placed in position the extensions $a$ and $b$ may be drawn together as tightly as desired and secured in place by the set-screw P, and the sliding arms G may also, as will be understood, be adjusted to accommodate the device to ears of corn of different lengths.

It will thus be seen that I accomplish the object of my invention by means of a device which is simple in construction and operation and one which is well adapted to produce the result for which it is intended.

Having fully described my invention, I claim as new and desire to secure by Letters Patent—

1. A corn-holder comprising two separate arms or handles which are pivotally connected and extended, the extended portions being bent to form angular arms or extensions which project in opposite directions, a sliding arm connected with each of said angular arms or projections, and adapted to be adjusted thereon, said sliding arms being bent to form parallel projections, with each of which is pivotally connected a cup-shaped holder, substantially as shown and described.

2. A corn-holder comprising two separate arms or handles which are pivotally connected and extended, the extended portions being bent to form angular arms or extensions which project in opposite directions, a sliding arm connected with each of said angular arms or projections, and adapted to be adjusted thereon, said sliding arms being bent to form parallel projections, with each of which is pivotally connected a cup-shaped holder, the convex portions of said holders being each directed inwardly, and each being also provided with inwardly-directed prongs, substantially as shown and described.

3. A corn-holder comprising two separate arms or handles which are pivotally connected and extended, the extended portions being bent to form angular arms or extensions which project in opposite directions, a sliding arm connected with each of said angular arms or projections, and adapted to be adjusted thereon, said sliding arms being bent to form parallel projections, with each of which is pivotally connected a cup-shaped holder, the convex portions of said holders being each directed inwardly, and each being also provided with inwardly-directed prongs, the extended portions of the handles being provided, one with a pivoted segmental arm, and the other with an attachment through which said arm projects, and said attachment being also provided with a set-screw which operates in connection with said segmental arm, substantially as shown and described.

In testimony that I claim the foregoing as my invention I have signed my name, in presence of the subscribing witnesses, this 30th day of October, 1895.

JAMES ECCLES.

Witnesses:
C. GERST,
A. M. CUSACK.